United States Patent [19]

Gunn

[11] 4,201,339
[45] May 6, 1980

[54] ARTICLE SORTING APPARATUS AND METHOD

[76] Inventor: Damon M. Gunn, 4007 49th St., NW., Washington, D.C. 20016

[21] Appl. No.: 374,171

[22] Filed: Jun. 27, 1973

Related U.S. Application Data

[62] Division of Ser. No. 91,701, Nov. 23, 1970, Pat. No. 3,757,942.

[51] Int. Cl.² .................. G06K 19/06; G06K 19/08
[52] U.S. Cl. .................................. 235/487; 235/491; 235/493
[58] Field of Search ........... 209/DIG. 1, 111.5, 111.7, 209/111.8; 235/61.11 E, 61.12 R, 61.12 N, 61.12 M

[56] References Cited

U.S. PATENT DOCUMENTS

| Re. 25,998 | 3/1966 | Silverschotz | 235/61.12 M |
|---|---|---|---|
| 2,719,629 | 10/1955 | Robinson | 209/72 |
| 2,775,405 | 12/1956 | Paston | 235/61.12 R |
| 2,815,400 | 12/1957 | Poylo | 179/2 DP |
| 2,988,984 | 6/1961 | Eckert, Jr. et al. | 101/2 |
| 3,083,904 | 4/1963 | Brenner et al. | 235/61.12 R |
| 3,090,870 | 5/1963 | Buckert | 250/557 |
| 3,122,237 | 2/1964 | Stenstrom | 209/564 |
| 3,180,996 | 4/1965 | DeGood et al. | 250/223 R |
| 3,221,148 | 11/1965 | Kreis | 235/61.12 R |
| 3,246,751 | 4/1966 | Brenner et al. | 209/569 |
| 3,350,545 | 10/1967 | Street | 235/435 |
| 3,355,016 | 11/1967 | Prince | 209/111.8 |
| 3,438,489 | 4/1969 | Camborac et al. | 209/576 |
| 3,486,040 | 12/1969 | McMillan | 307/364 |
| 3,562,497 | 2/1971 | Gastal et al. | 235/61.12 R |
| 3,609,306 | 9/1971 | Langley | 235/61.11 E |
| 3,614,396 | 10/1971 | Goldstern | 235/61.12 R |
| 3,648,838 | 3/1972 | Hiromura | 209/111.7 |
| 3,652,830 | 3/1972 | Kessler | 235/61.12 N |
| 3,774,758 | 11/1973 | Sternberg | 209/DIG. 1 |

Primary Examiner—Daryl W. Cook
Attorney, Agent, or Firm—Jim Zegeer

[57] ABSTRACT

There is disclosed an article sorting apparatus and method wherein articles bearing a manually marked code in a grid or code area locatable by one or more guide elements which may be separate and distinct from the manually marked code. For postal articles, such as letters and the like, the code may be the zip code, preferably associated with a unique postage stamp, also disclosed herein, marked on a grid by dots, circles, line "X" or like optical marks. On passsing through a reading station, the articles, particularly postal articles, are turned upside down so as to minimize the amount of adjustment or orientation of the optical reader relative to the code bearing grid and also to accommodate, for example, various sized envelopes. There is also disclosed a reader for the guide elements for determining the location of the grid and orienting manually marked reading device.

9 Claims, 8 Drawing Figures

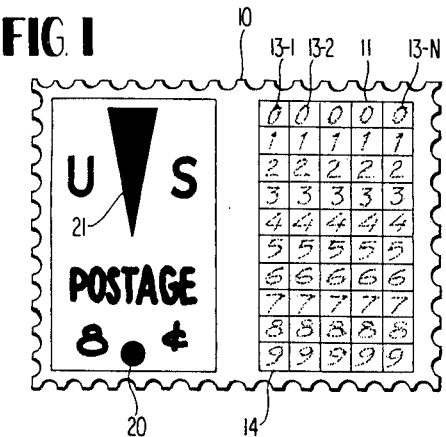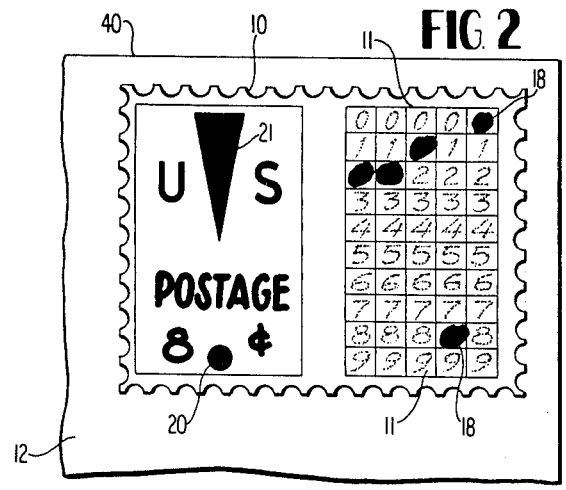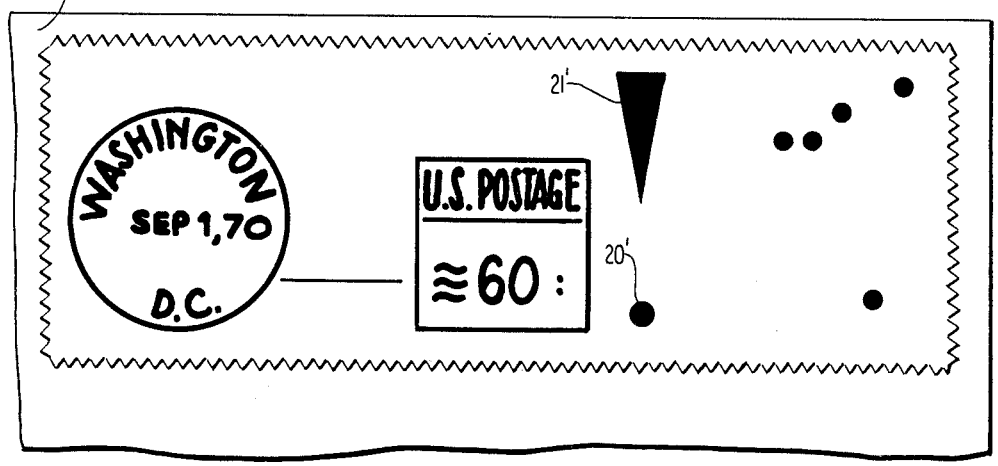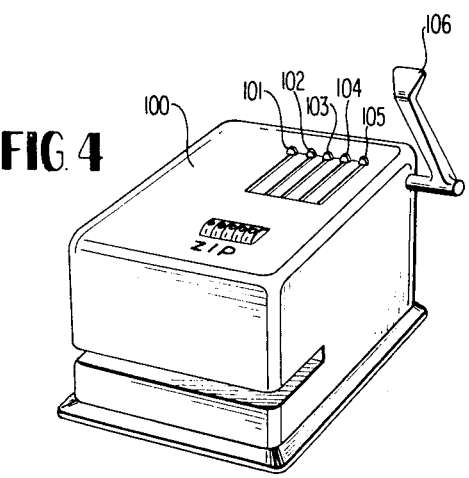

ARTICLE SORTING APPARATUS AND METHOD

This is a division of application, Ser. No. 91,701, filed Nov. 23, 1970 now U.S. Pat. No. 3,757,942.

BACKGROUND AND BRIEF DESCRIPTION OF THE INVENTION

The present invention is directed to article sorting apparatus and methods which seek to economically bridge the gap between machine sorting of articles and the manual addressing of same. For background material which exposes the magnitude of the problem in the postal area, the reader is directed to the many publications of the Post Office Department and including "Human Factors Engineering in the Sorting and Handling of Mail," "Memorandum on Postal Needs" (H. F. Faught) and "Post Office Automatic Address Reader." There are, of course, a large number of prior art disclosures and apparatus presently available which have this same or similar objective, as for example, disclosed in the following U.S. Pat. Nos: RE. 25,998 (Original 3,136,424) to Silverschotz; 3,350,545 to Street; 3,438,489 to Cambornac et al.; 3,090.870 to Ruckert; 3,486,040 to McMillan; 3,180,996 De Good et al.; 3,122,237—Stenstrom; 2,988,984 Eckert, Jr. et al. 3,246,751—Brenner et al. and 2,815,400 Poylo; there being many others. While a number of prior art systems provide for machine readable manually marked codes (as well as mechanically marked codes), it is evident from the recent, above noted, postal announcements that such systems have not solved the problem of bridging the gap between machine reading and manual marking of codes. While the present invention is directed principally towards method and apparatus for utilization and reading of manually marked codes, it will be apparent that several of the features to be described in greater detail, namely (1) the upside down passing of the articles through the reading station, and (2) the means for locating the manually markable grid, can be used to advantage in machine or mechanically marked codes.

In a highly preferred form, the invention contemplates a postage stamp or other member having an adhesive on one surface or other, means for affixing same to an article to be sorted. A code grid is printed or formed on the exposed surface of the stamp, the grid or template being adapted for receiving a manually placed pattern of visible code markings, as made by a pencil, pen or the like. If the grid is printed, the ink used should be of a material which is sensed differently from the material used to make the code; it could be magnetic ink and hence can serve as the guide element. If the grid is light colored and the article surface is dark, (or vice versa) the code may be punched as by a manual hole punch device. In combination with the manually markable grid and as a dominant feature of the invention is a code grid locating means or guide element, preferably composed of a pair of physically dissimilar spaced marks at least one of which is elongated which are responsive and different in character from the manually marked code. As indicated above, in some cases, if the grid or template is printed with magnetic ink it then can serve as the guide element.

The apparatus includes means for passing the articles, if postage envelopes, in upside down fashion, along a path through a reading station. The reading station includes means for detecting the code grid locating means or guide elements and using same to orient either the article or manual code reading apparatus to accurately read the manually marked code. After the manually marked code is read and a signal corresponding thereto, produced, the article is directed to the destination thereof according to the signal so produced.

The pair of code grid locating or guide elements may be conductive, magnetic, fluorescent, or other electroresponsive elements, and one of the pair may be an elongated diamond and the other a circle, or other geometrically different shape such as a line on the grid so as to simplify detection and location, it being understood that the grid or template may be made to serve as locating means itself.

As mentioned above, the articles are passed in upside down fashion through the reading station. Since most postal articles, particularly envelopes and flat articles, have the postage placed in the upper right hand corner thereof the upside down passage of the article through the reading station minimizes the degree of relative movement necessary to assure accurate reading of the manually marked code, and, of course, eliminates large adjustments for varying size envelopes, etc.

BRIEF DESCRIPTION OF THE DRAWINGS

The above and other features and advantages of the invention will become more apparent from the following specification taken in conjunction with the accompanying drawings wherein:

FIG. 1 illustrates a postage stamp incorporating the invention;

FIG. 2 illustrates the postage stamp of FIG. 1 as manually marked and affixed to an article such as an envelope;

FIG. 2A illustrates a postage stamp manually marked with numerals in accordance with an aspect of the invention;

FIGS. 3 and 4 illustrate a mechanically marked zip code as well as a postage meter device for doing same;

FIG. 1 illustrates a postage stamp 10 carrying a code grid 11 on its upper surface having the conventional adhesive (not shown) on the reverse surface for adhering same to an envelope 12, FIG. 2 for example. The adhering means could be a pressure sensitive adhesive, tape or staples, or an insert in a pocket on the side of a freight car, or, preferably may simply be printed in the corner of all envelopes, shipping labels, etc., or at some other location. In the latter case, of course, the locating of same for mechanical reading will be simplified. At any rate code grid 11 is affixed to an outside surface of the article to be sorted.

Code grid 11 comprises a plurality of vertical columns 13-1, 13-2 . . . 13-N which, in the embodiment shown, have ten blocks each for the numerals 0–9 and are in sequence. It will be appreciated that more or less blocks may be used, those enclosed for the digits 0–9 being for the purpose of using the zip code system to facilitate mail delivery. Thus instead of numerals, letters of the alphabet may be used, and it will be apparent that instead of a row 14 of digits 0–9, each block may have its number printed therein. In the embodiment shown in FIG. 1, the code is manually marked by the user by entering dots, circles or X's or similar markings in the blocks as shown in FIG. 2. In FIG. 2 the zip code number "22180" has been manually marked by pencilling in the appropriate blocks with marks 18 in the manner shown.

Figure 6:
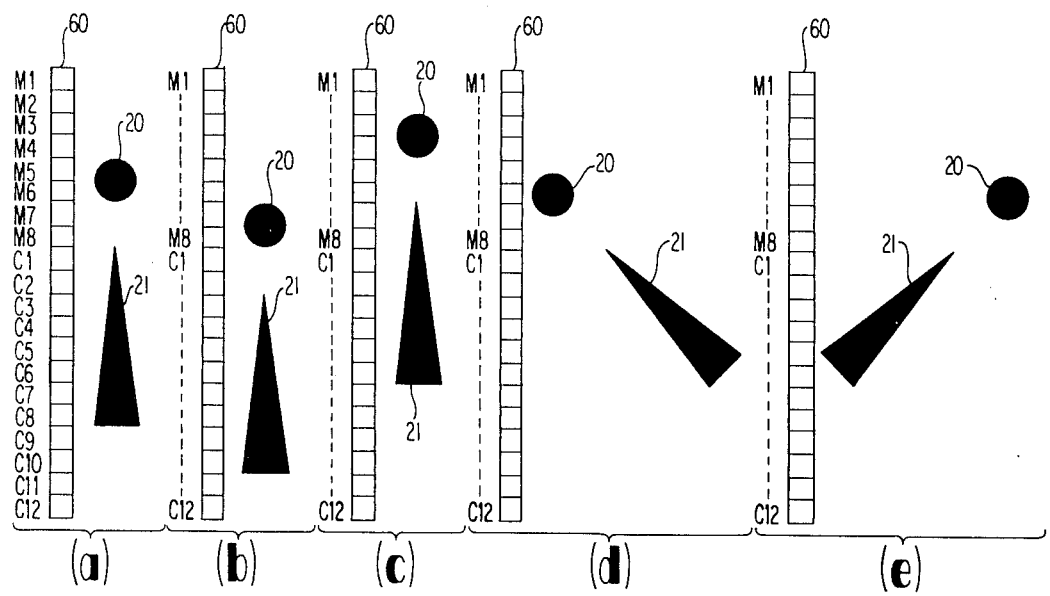
FIG. 6 (*a*) to FIG. 6 (*e*) illustrates various orientations of the grid guide elements as they pass through the reading station sensing elements.

Code grid 11 has integrally associated therewith a pair of code grid locating elements 20 and 21, constituted by a circle and an elongated diamond (it could be an open, FIG. 2A or elongated rectangle, dotted in FIG. 6 (a)), respectively. These geometrical shapes have the orientations and the physical properties of elements 20 and 21 which have been selected to provide reference means for locating the marks 18 in the code grid 11. Thus elements 20 and 21 may be magnetic ink, fluorescent or conductive but must be different from the material used for the code mark 18. Alternatively element 20 may be fluorescent and element 21 may be magnetic, the main requirements being that the material of these elements be optically different and detectable by a device which ignores the materials in markings 18. It would be preferable to have these markings easily recognizable by electronic means so that an article with such marks as 20 and 21 submitted to such device would be easily oriented to a good reading position. Obviously, more or less different guide elements such as lines, designs with the code grid 11 may be used. As noted earlier, guide elements 20 and 21 are for the purpose of locating the code marks in the template or code grid 11 which means the orientation thereof as well as the registration of same, because these guide elements are used to effect a relative adjustment between the code reading device and the code grid and the markings 18 so that an accurate reading of the manually marked code can be made. In keeping with a major objective of the invention it will be noted that the user of the code grid may be somewhat sloppy in marking the code. That is to say that as long as the major position of a marking 18, is within desired code block, it will be registered for that block (apparatus for assuring this result by discrimination is known in the art as shown in the above McMillan patent).

Guide elements 20 and 21 are located to the left of code grid 11 in FIGS. 1-3 because in the preferred practice of this invention as applied to postal articles such as envelopes, the envelopes are turned upside down, with the top edge on a conveyor or guide rail and conveyed through a guide element detection station from left direction to right direction. In this way, the guide elements 20 and 21 are presented to the detection station slightly in advance of the code grid 11 although this is not mandatory as it is obvious that the guide elements may follow the grid through the reading station because the code reader is adjusted on deriving the position data from the guide elements. Thus, these guide elements 20 and 21 may have such additional marking so that if the envelope and stamp were read in reverse, that different code message would be reversed. This is particularly important if the device were used on freight cars where they might be moved past a reading device from either right to left or left to right.

As shown in FIG. 2A the postage stamp 10' has grids in two banks, 11A' with printed copy book numerals, and 11' grid elements designed to receive manually made marks as numerals 18'; such numerals only in 11' being read by optical character readers now well known in the art and disclosed in the above Post Office Department Publications, as an example.

DESCRIPTION OF APPARATUS IN FIG. 5

Figure 5:
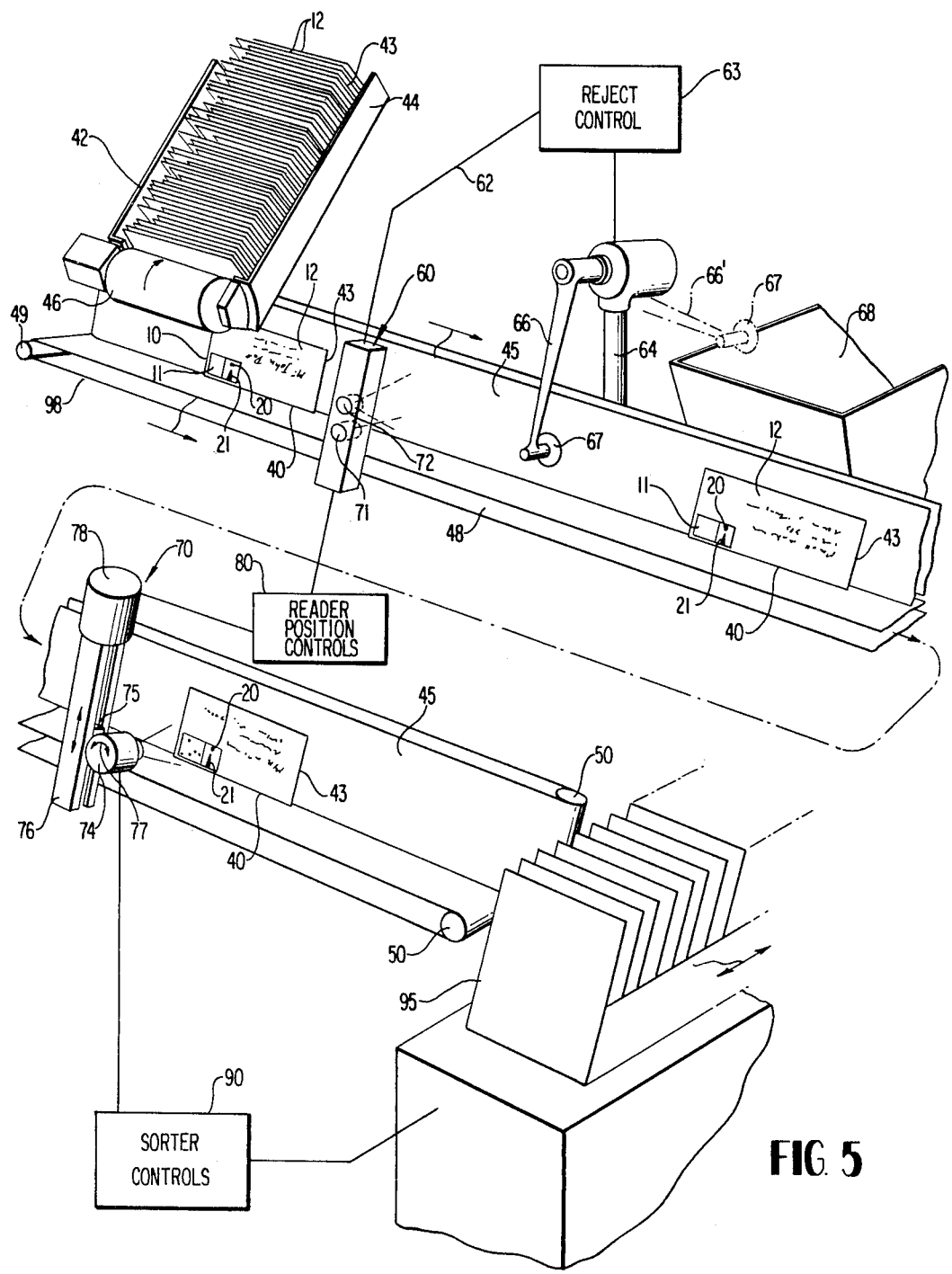
FIG. 5 is a partial isometric view illustrating apparatus for the storing of postal articles according to the invention.

Referring to FIG. 5 of the drawings, postal articles, such as a stack of envelopes 12, which have been previously oriented to have their stamp bearing upper right hand corner, relatively, so that, the upper (relative) edge 40 of the article (envelope 12) serve as a rough or coarse guide to orienting the relative location of the code guide elements 20 and 21 and manually marked grid 11 with respect to the use of the guide elements for fine or vernier adjustments of the manually marked grid for reading of the code thereon. Thus, prior to placing the stack of envelopes in inclined hopper 42 with edges 43 abutting stop plate 44, the envelopes 12 are oriented as described. Suitable apparatus for orienting the article is disclosed in Eckert et. al. U.S. Pat. No. 2,988,984, it being understood that this may be done manually or by other suitable apparatus for orienting postal articles for postage cancellation.

A feed roller mechanism 46, at the bottom of hopper 42, is used to remove envelopes 12, one at a time and in relatively uniformly spaced relation, for deposit in horizontally canted conveyor 48, which, in the embodiment shown, is an endless conveyor belt trained over drive rollers 49 and 50 proximate the input and output ends respectively; a canted vertical conveyor 45 serves as a guide and support for the conveyor for conveyor 48, it being understood that other conventional article conveying systems may be used. Roller 46 may be a continuously rotating friction element which is cammed at timed intervals into feeding engagement with the bottom envelopes in hopper 42, or may be a suction feed roller or the like. Since the envelopes may vary in size the hopper 42 is opensided and the thickness or opening at the lower end thereof, is controlled by, for example, a spring biased plate, not shown, so that as the roller engages an envelope 12 (or suction is applied), it is drawn through the opening and enlarges same against the spring.

Preferably a pair of scanning or reading stations 60 and 70 are utilized, the first station 60 serving primarily as a reading station for detecting the existence and precise location and relative orientation of grid guide elements 20 and 21 (or the grid itself if it is serving as the guide elements) to produce signals controlling the position and orientation of grid code reader 74 at station 70 (while not shown), the envelope orientation could be used to detect the time of passage of articles, the absence of or grossly misoriented grid guide elements 20 and 21, or even missing stamps or conflicting stamps, and may produce a reject signal, on line 62 to reject control circuitry 63 which, in turn, supplies a driving signal to reject mechanism 64.

Reject mechanism 64, in the embodiment shown, is a vacuum cup or chamber which on receipt of a reject signal from reject control circuit 63, removes the article from conveyor 48 and deposits same in hopper 68. Its operating mechanism includes an arm 66, having vacuum cup 67 connected to a controlled vacuum source (not shown), which cup is quickly reciprocated, first into engagement with the article, then arm 66 is rotated upwardly and reciprocated outwardly to where vacuum cup 67 is over reject hopper 68, the vacuum released to thus deposit the rejected envelope 12 in hopper 68. However, for purpose of speed, arm 66 may simply "kick" the envelope off of the conveyor or, the reject signal may be stored in a memory and used subsequently to cause the sorter controls to operate and place the article in a special receptacle.

As noted above, the principal objective of reading station 60 is to detect the existence, location, and orientation of guide elements 20 and 21 and produce positioning servo signals for grid code reading station 70. For this purpose it includes two units of detecting elements 71 and 72. Detecting elements 71 and 72 may detect magnetic, electrostatic, fluorescent or conductive elements, depending on whether grid guide elements 20 and 21 are magnetic, electrostatic, fluorescent or conductive. It is again emphasized that the characteristic of guide elements 20 and 21 which is to serve as the detection mechanism for these elements is significantly different, as a physical phenomena, than the manually made optically visible code markings 18, 18' which for purpose of reference are made by a pencil, ball point pen, or manual impression stamp, adhesive dots, or can be punched holes provided there is a contrasting background color on the envelope 12. Thus, the grid guide elements 20 and 21 can be optically invisible or optically visible as long as the material nature thereof is significantly different from that of a manually marked code. It will be apparent that if the grid squares 11' are small and numerous enough, FIG. 2A, the digits of the code may be written through the squares becoming code marks 18' and 18' in the squares 11' and read at 70 by a similarly referenced and oriented reading apparatus 74. Moreover grid guide code element 20 may be magnetic and grid guide code element 21 can be fluorescent, e.g. non-magnetic. In this case the upper detection unit 72 would project a fluorescent responsive beam which would activate element 20 and detect the response and the lower detector unit 71 would detect magnetization of grid guide element 21. It will be apparent that various other arrangements may be used, the responses being combined and analyzed in reader position controls unit 80 in the manner described more fully hereinafter.

Reading station 70 includes an optical head 74 having a bank of photocells arranged in the pattern of template or code grid 11 so as to read code markings 18 (FIG. 2). Optical head 74 is mounted on a carrier 75 to be adjustably positioned linearly along rack-support 76, as indicated by the arrows. Optical head 74 is also rotatably adjustable in carrier 75, as indicated by the curved arrows 77. The linear and rotating adjustment of optical head 74 are carried out by servo element 78, it being apparent that a separate servo element may be carried in carrier 75, and coupled to optical head 74 to effect rotary adjustment of same. Signals for driving the servos are obtained from the reader positioning control circuit 80 in the manner described hereinafter. In the event that after the fine or vernier positioning of the optical head 74 the code is unreadable, e.g. there are inadequate signals developed by head 74, a signal may be produced by apparatus, not shown, to cause sorter control circuit 90 to effect delivery of the article to a further reject bin or storage receptacle for further processing.

In its preferred form head 74 may comprise a bank of photocells (or an optical character reader), one for each manually markable code position and which are simultaneously activated by an electronic shutter. Moreover, once the code is "read" it may, if desired, be mechanically printed on the article so as to facilitate the next sorting of the same article. It may be desirable to provide a second set of guide reading and code reading stations with the output of the first being stored and compared against the output of the second.

Once the manually marked code has been read by optical head 74 the information is decoded in sorter control 90 which operates to adjust the position of receiving bin or hopper 95 relative to the output end of conveyor 48 in a conventional manner. Multiple hopper 95 is simply diagramatic as it is apparent that various forms of deflector gates (See U.S. Pat. Nos. 3,246,751, 2,988,984, 2,950,005, etc.) for this type of selective delivery apparatus may be used in this invention.

While the invention has its greatest utility in interfacing the human or manually marked code elements to automated sorting operations, aspects of the invention may be applicable to machine marked codes where the vagaries of manual marking are eliminated or greatly reduced. In FIG. 4 there is illustrated a manually operated machine for mechanically marking of a zip code on an envelope as illustrated in FIG. 3. In this case, the machine 100 has a series of levers 101, 102 . . . 105 each of which positions a code marking element (not shown) according the position of the levers, much in the same manner as a postage meter, and printed by activation of operating lever 106.

Figure 7:
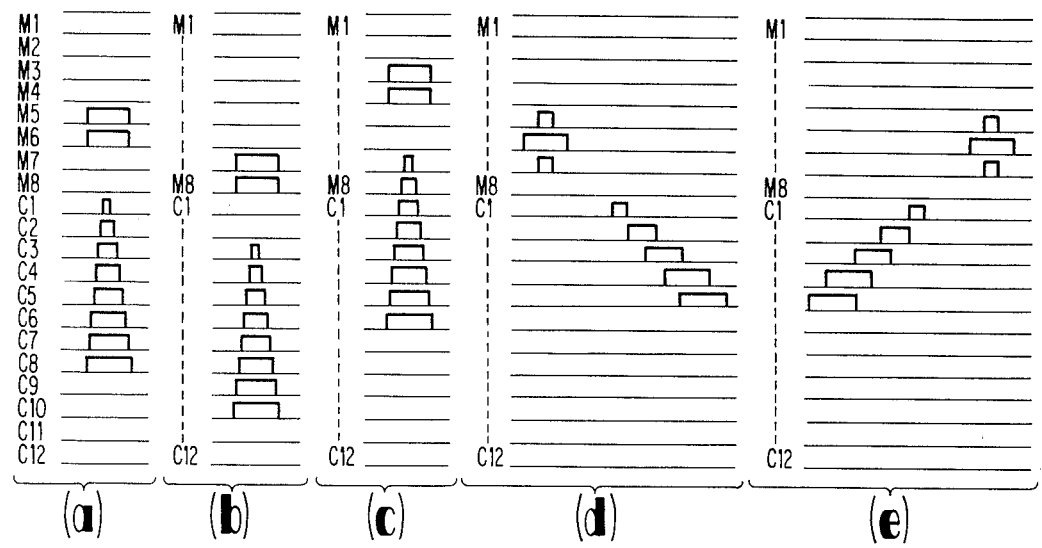
FIG. 7 (*a*) to FIG. 7 (*e*) illustrate the wave form of the output signals from the sensing elements of FIG. 6 (*a*) to FIG. 6 (*e*), respectively.

Referring now to FIGS. 6 (a) through (e), the reading station 60 is shown as having magnetic reading heads M1, M2 . . . M8 (corresponding to sensor 72 of FIG. 5) and electrical brush elements C1, C2 . . . C12 (corresponding to sensor 71 of FIG. 5). Regarding these brushes, the first to contact same serve as common for the remainder. In these diagrammatic representations postal articles have guide elements 20 and 21 in various locations and angular orientations; In FIG. 6 (a) the guide elements 20 and 21 are approximately at the standard or desired position, in (b) slightly low, (c) slightly high, (d) tilted approximately 45° to the left, and (e) tilted approximately 45° to the right. If for any reason the sensors fail to detect the phenomena they are designed to detect at a selected time interval a signal is produced to reject same. In FIG. 7, the lines labeled M1 . . . M6 correspond to the Magnetic read heads M1 . . . M6 respectively and the lines labeled C1 . . . C12 correspond to the brush elements C1 . . . C12. With the guide elements 20 and 21 having the orientations illustrated in FIG. 6 (a) to FIG. 6 (e) in 7 (a), there are no pulses on lines M5 and M6 an C1 to C8 and since there is no time differential between the center positions of these pulses it is known that the elements were vertical (relatively) and at the position denoted by which of the sensors produced signals pulses. Thus in FIGS. 7 (b) and 7 (c) only the relative height position has changed. By knowing which sensor produced an output signal pulse the location of the guide elements is known. In FIGS. 6 (d) and (e) the guide elements are inclined 45°. In FIGS. 6 (e) the element 20 is in advance of elongated element 21 so that signals in magnetic heads M1 . . . M8 will be in advance (see FIG. 7 (e) ) of signals from brush sensors C1 . . . C12 whereas in FIG. 6 (d) the opposite condition prevails. Hence by knowing the times of occurances of the signal pulses from the two sets of sensors any ambiguity is easily resolved. Moreover, it will be noted that the lengths of the pulses from the brushes in FIGS. 7 (d) and (e) are of different lengths and by comparing such pulses in read position control 80 with the standard thereof the degree of angularity may be easily determined so that accurate positioning signals may be supplied by control 80 to reading station 70 for positioning head 74.

It will be obvious that many changes may be made in the invention some of which have been indicated herein. Accordingly while the invention has been described in connection with specific apparatus, it is to be understood that this description is made by way of example and not by way of limitation except as set forth in the claims appended hereto.

What is claimed is:

1. A postage stamp comprising a laminar body member, having means for securing same to a surface of a postal article, means forming a grid on the outer surface of said laminar body member, said grid being adapted for receiving manually placed pattern of visible code markings, grid locating means on the same surface as said grid and adapted to produce guide signals for subsequent orientation of said manually placed pattern relative to a reading station, and said grid locating means comprising at least a pair of guide elements, one of which is an elongated geometrical shape.

2. The invention defined in claim 1 wherein said guide elements provide distinctly different responses, selected sensor means or reading apparatus there for.

3. A code-carrying device attachable to envelopes and other articles comprising a combination of two or more marking materials, each marking material having at least one selected color, texture, chemical or electrical qualities, a first of said marking materials having magnetic, fluorescent, or other electronic qualities which are sensible differently from ordinary manually made marks, a printed template consisting of visible and mechanically printed rows and columns of characters written in a given order to suggest the location for said manually made mark for that character in the code, the characters in the template covered by the marks being of the characters of the code and at least a pair of guide elements uniquely shaped and positioned on said device as to produce guide signals for orientation of said manually placed patterns relative to a reading station.

4. A stamp as a postage stamp, adapted to be affixed to objects such as letters, comprising a template printed with an ink electrically sensibly different from the mark of an ordinary pen or pencil, and in a form to provide a form for marking a code thereon with an ordinary pen or pencil in the space referred to in the electronically sensible ink, and guide means printed on the surface of said stamp and positioned thereon as to produce guide signals for orientation of said template relative to a reading station.

5. A sorting device comprising in combination a laminar body member a machine readable destination code on a surface of said body member, and machine readable lateral and angular guide means formed on said surface of said laminar body member and spaced from the edge thereof and adapted to produce guide signals for laterally and angularly orienting a machine reader of said machine readable destination code.

6. The invention defined in claim 5 wherein said lateral and angular guide means includes at least one elongated geometrical shape.

7. The invention defined in claim 5 wherein said machine readable destination code is formed of a material which is ignored by a reader for said machine readable lateral and angular guide means.

8. The invention defined in claim 5 wherein said machine readable destination code is in a selected area of said surface and is constituted by means forming a grid on the body of said laminar member and adapted to receive visible machine readable destination codes therein.

9. A postage stamp adapted to be applied to a mailing piece and including a printed matrix having a number of columns corresponding to the number of digits or characters in an existing postal destination code system, each column having a plurality of cells, each cell corresponding to one of the number or characters employable for each of said digits, the matrix being encodable by the sender of the mailing piece with the postal code of the destination thereof by the application to a selected cell of each column of a marking which can be sensed optically by a reading machine, the improvement wherein machine readable markings are imprinted on said postage stamp, said machine readable markings being adapted to establish a relative orientation between the matrix and the reading machine.

* * * * *